(12) United States Patent
Sung et al.

(10) Patent No.: US 12,503,789 B2
(45) Date of Patent: Dec. 23, 2025

(54) DIE-CASTING METAL PART-POLYMER RESIN COMPOSITE AND METHOD FOR PREPARING SAME

(71) Applicant: PLASTAL CO., LTD., Ansan-si (KR)

(72) Inventors: Mu Chang Sung, Incheon (KR); Jae Ik Kim, Seoul (KR); Jae Hwa Kim, Seoul (KR); Sung Ho Hong, Incheon (KR)

(73) Assignee: PLASTAL CO., LTD., Ansan-si (KR)

( * ) Notice: Subject to any disclaimer, the term of this patent is extended or adjusted under 35 U.S.C. 154(b) by 182 days.

(21) Appl. No.: 18/272,436

(22) PCT Filed: Dec. 10, 2021

(86) PCT No.: PCT/KR2021/018785
§ 371 (c)(1),
(2) Date: Jul. 14, 2023

(87) PCT Pub. No.: WO2022/158714
PCT Pub. Date: Jul. 28, 2022

(65) Prior Publication Data
US 2024/0084474 A1    Mar. 14, 2024

(30) Foreign Application Priority Data
Jan. 25, 2021 (KR) .................. 10-2021-0009837

(51) Int. Cl.
*B29C 45/14* (2006.01)
*B29K 705/02* (2006.01)
(Continued)

(52) U.S. Cl.
CPC .............. *C25F 3/02* (2013.01); *B29C 45/14* (2013.01); *B29C 2045/14868* (2013.01);
(Continued)

(58) Field of Classification Search
CPC ......................................... B29C 2045/14868
See application file for complete search history.

(56) References Cited

U.S. PATENT DOCUMENTS

2016/0160371 A1    6/2016  Chang et al.
2019/0322077 A1*  10/2019  Sun .................. C25D 11/16
2020/0171722 A1    6/2020  Kim

FOREIGN PATENT DOCUMENTS

CN       107779931 A       3/2018
JP     2007050630 A  *    3/2007
(Continued)

OTHER PUBLICATIONS

Yongsug Tak, et al., "Electrochemical Properties of Metal Aluminum and Its Application," Article, The Korean Society of Industrial and Engineering Chemistry, vol. 17, No. 14, pp. 335-342, Aug. 2, 2006.

(Continued)

*Primary Examiner* — Jacob T Minskey
*Assistant Examiner* — Virak Nguon
(74) *Attorney, Agent, or Firm* — Dinsmore & Shohl LLP; Yongsok Choi, Esq.

(57) ABSTRACT

The present invention relates to a metal-polymer resin composite in which a polymer resin is directly injection-molded to a zinc alloy, a magnesium alloy, or a die-casting part thereof, and thus an injection product is directly bonded to a metal surface, wherein in the case of a hard polymer resin, a tensile strength of the metal and the polymer resin is 30 MPa or greater, and in the case of a soft polymer resin, a tensile strength of the metal and the polymer resin is 20 MPa or greater, and an average helium leakage after 10 times of measurement is $10^{-8}$ Pa·m$^3$/s or less, and a novel method for preparing the same.

4 Claims, 2 Drawing Sheets

(51) Int. Cl.
 *B29L 31/30* (2006.01)
 *B29L 31/34* (2006.01)
 *C25F 3/02* (2006.01)
 *C23F 1/14* (2006.01)

(52) U.S. Cl.
 CPC ... *B29K 2705/02* (2013.01); *B29L 2031/3002* (2013.01); *B29L 2031/34* (2013.01); *C23F 1/14* (2013.01)

(56) References Cited

FOREIGN PATENT DOCUMENTS

| | | | |
|---|---|---|---|
| JP | 2019098710 A | * | 6/2019 |
| KR | 101606567 B1 | | 3/2016 |
| KR | 101794583 B1 | | 11/2017 |
| KR | 101893884 B1 | | 8/2018 |
| KR | 101923897 B1 | | 11/2018 |
| KR | 1020190022792 A | | 3/2019 |
| KR | 102148308 B1 | | 8/2020 |

OTHER PUBLICATIONS

International Search Report of PCT/KR2021/018785 dated Mar. 18, 2022.

* cited by examiner

[FIG. 1]
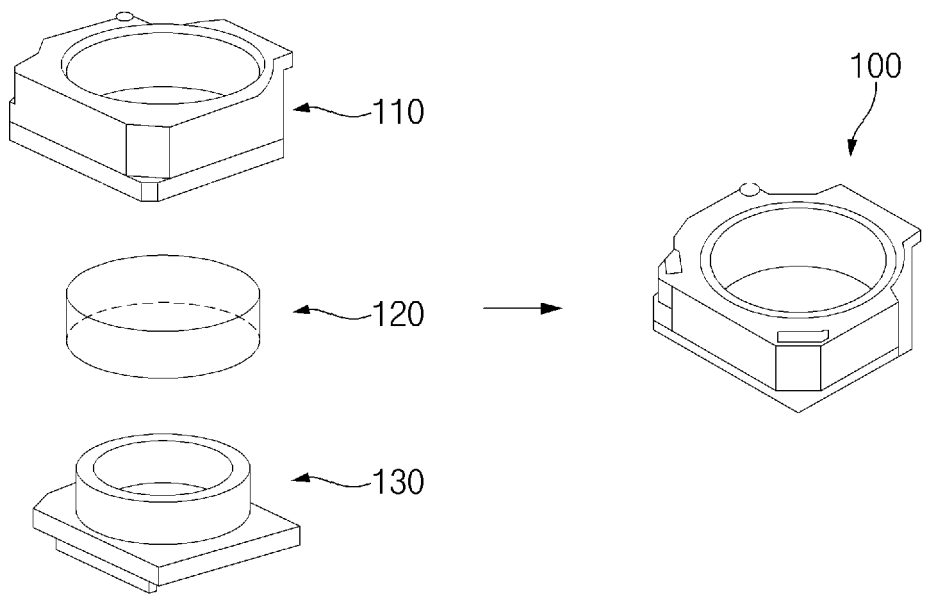
[FIG. 2]
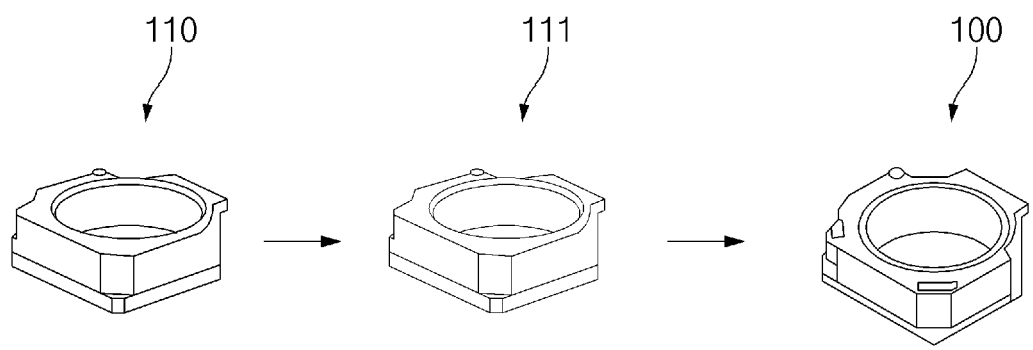

[FIG. 3]
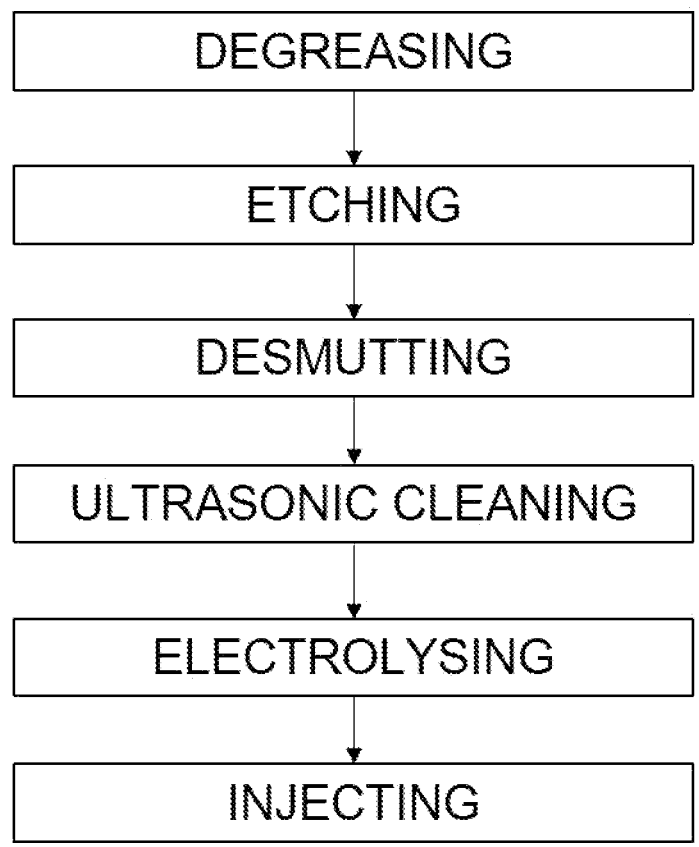

DIE-CASTING METAL PART-POLYMER RESIN COMPOSITE AND METHOD FOR PREPARING SAME

CROSS-REFERENCE TO RELATED APPLICATIONS

This application claims the benefit of Korean Patent Application No. 10-2021-0009837, filed on Jan. 25, 2021, in the Korean Intellectual Property Office, the disclosure of which is incorporated herein in its entirety by reference.

TECHNICAL FIELD

The present invention relates to a metal-resin composite in which a polymer resin is bonded onto a substrate of a metal, particularly a zinc alloy, a magnesium alloy, or a die-casting part thereof, and a method for preparing the same.

BACKGROUND ART

A metal-resin composite has waterproof properties as a polymer resin is bonded or applied to a metal, particularly aluminum or an alloy thereof, and is widely used in electronic devices, automobile parts, and the like.

The metal-resin composite is typically subjected to cleaning, washing, and degreasing, and then etching, and subsequently electrolyzing to form micropores in aluminum and an oxide film on a surface thereof, and then a polymer resin is bonded to aluminum through injection, thereby preparing an aluminum-resin composite.

US Patent Publication No. 2016-160371A1 in the related art discloses a method for preparing an aluminum-resin composite by performing degreasing at a relatively high temperature using a degreasing solution containing sodium carbonate and the like, performing etching in an alkaline aqueous solution containing 30 to 60 wt % of sodium hydroxide, and then forming micropores using an acidic aqueous solution containing phosphoric acid, sulfuric acid, oxalic acid, and citric acid as an electrolyte, and injecting.

In addition, Korean Patent Registration No. 1606567 discloses a method for preparing an aluminum-resin composite having a bonding strength of 38 Mpa or greater through etching in two steps of an acidic aqueous solution containing hydrochloric acid and an acidic aqueous solution having an acid concentration of 10 to 80 wt %, and then electrolyzing using a diazole-based derivative compound, and injecting.

In addition, Korean Patent Registration No. 2148308 discloses a method for preparing an aluminum-resin composite through electrolyzing at a current density of 0.1 to 2.0 $A/dm^2$ in an acidic solution using an aluminum alloy metal material as a positive electrode, and then electrolyzing again in an aqueous solution containing a triazine thiol derivative.

In addition, Korean Patent Registration No. 1893884 discloses a method for preparing an aluminum-resin composite having a bonding strength of about 40 MPa or greater through degreasing in an aqueous solution such as sodium bicarbonate and sodium hexametaphosphate, and then etching in an acidic aqueous solution containing oxalic acid, acetic acid, nitric acid, hydrochloric acid, or hydrogen peroxide, and etching again in an aqueous solution containing sodium bicarbonate, sodium hydroxide, sodium tetraborate, and the like, and electrolyzing in an aqueous solution containing oxalic acid, sulfuric acid, and carboxylic acid.

In addition, Electrochemical Property of Metal Aluminum and Its Application (Yongsug Tak, Korean Ind. Eng. Chem. Vol 17, No 4, pp 335-342, August 2006) shows the results of pore formation according to the applied current, etching solution, temperature, and the like in an electrolyzing process of an aluminum surface.

However, these typical methods are all for aluminum alloys, and not for zinc alloys or magnesium alloys commonly used in die-casting.

Unlike other uses, zinc alloys or magnesium alloys used in die-casting contain up to 15% of other metals and impurities other than a main metal. Accordingly, even when a desmut process was performed using an aqueous solution of nitric acid after an etching process, smut was not easily removed from a surface of a metal, and when a metal-polymer resin bonded body is prepared for a die-casting part through typical processes, tensile strength (adhesion) was not sufficient. In other words, the same results were not obtained when the typical method applied to aluminum was applied to materials for die-casting, such as zinc alloys or magnesium alloys.

Accordingly, typically, die-casting parts and plastic injection parts were bonded using double-sided tape or glue, and this caused a greater thickness, a greater curing time of an adhesive of the double-sided tape or glue, an increasing number of processes, tolerance from the dissimilar material assembly, a low bonding strength of about 25 MPa, and reduced airtightness from deterioration in uniform airtightness.

Therefore, the development of a method for preparing a metal-polymer resin bonded body capable of providing high bonding strength and airtightness even when applied to die-casting materials such as zinc alloys or magnesium alloys, and a metal-polymer resin bonded body in which a polymer resin and materials for die-casting are directly bonded through this method has been required.

RELATED ART DOCUMENT

[Patent Document]
US Patent Publication No. 2016-160371A1
Korean Patent Registration No. 1893884
Korean Patent Registration No. 1606567
Korean Patent Registration No. 2148308
[Non-patent Document]
Yongsug Tak, Electrochemical Property of Metal Aluminum and Its Application (Korean Ind. Eng. Chem. Vol 17, No 4, pp 335-342, 2006.8.)

DISCLOSURE OF THE INVENTION

Technical Problem

An aspect of the present invention provides a metal-polymer resin bonded body having a polymer resin directly bonded onto a substrate of a metal, particularly a zinc alloy, a magnesium alloy, or a die-casting part thereof, and still obtaining a sufficient tensile strength unlike the related art.

Another aspect of the present invention provides a method for preparing the metal-polymer resin bonded body.

Technical Solution

To prevent the technical limitations described above, the present invention is characterized in going through both desmutting and ultrasonic cleaning after etching in a typical process that basically goes through degreasing, etching, and electrolyzing, and also using an electrolyte containing any one among (1) hydroxide of an alkali metal or an alkaline earth metal, (2) phosphate or sulfate, and (3) silicate in the electrolyzing. The present invention is also characterized in using an alkaline aqueous solution as a desmut solution in the processes described above.

Advantageous Effects

Unlike the related art, a composite of a zinc alloy, a magnesium alloy, or a die-casting part thereof and a polymer resin, which is prepared through the processes described above has high bonding strength and excellent airtightness.

BRIEF DESCRIPTION OF THE DRAWINGS

FIG. 1 is an illustrative view of the related art;
FIG. 2 is a schematic view of a product and processes according to the present invention; and
FIG. 3 is a process chart of the present invention.

MODE FOR CARRYING OUT THE INVENTION

As shown in FIG. 1, typically, metal die-casting and an injection product were separately prepared, and then bonded using double-sided tape, glue, or the like. This required multiple processes, and caused a greater thickness due to the glue and the tape, a greater curing time of the glue and the tape, tolerance from dissimilar material assembly, and a low bonding strength (tensile strength) of about 25 MPa or less for a polymer resin.

However, as shown in FIG. 2, in the present invention, a metal-polymer resin bonded body injection product having very high bonding strength, which is capable enough to prevent the limitations above at once and suitable for commercialization by especially etching, desmutting, cleaning, and electrolyzing metal die-casting, and then directly injection molding the metal die-casting to prepare a metal-polymer resin assembly. Specific embodiments of each step of the present invention are as illustrated below, but are not necessarily limited thereto.

Degreasing is usually performed at a temperature of 30 to 80° C. for 30 to 300 seconds, and when needed, ultrasound may be applied, and the degreasing is performed using a degreasing solution containing at least any one of sodium carbonate, sodium phosphate, sodium silicate, sodium hydrogen carbonate, or sodium hexametaphosphate. In particular, preferably, sodium carbonate and sodium phosphate are included for high efficiency of degreasing. Preferably, with respect to 100 parts by weight of distilled (or deionized) water, 0.1 to 15 parts by weight of sodium carbonate, 1 to 10 parts by weight of sodium phosphate, 0.3 to 3 parts by weight of sodium silicate, 0.5 to 10 parts by weight of sodium hydrogen carbonate, and 0.5 to 10 parts by weight of sodium hexametaphosphate are typically included.

After the degreasing and before etching, chemical treatment using a non-etching solution is also available.

The etching is performed in one step or two steps, and in the case of a one-step process, preferably, an acidic aqueous etching solution is used, and in the case of a two-step process, an etching process of an acidic aqueous solution may be performed first, and then the etching process may be performed again using an acidic aqueous solution, but preferably, in the latter part, the etching process of an alkaline aqueous solution is performed in terms of uniformly forming pores having a size of several tens of nm.

As the acidic etching solution, an aqueous solution containing at least one of hydrochloric acid, sulfuric acid, nitric acid, or hydrogen peroxide is preferable, and 3 to 15 parts by weight of sulfuric acid, 3 to 15 parts by weight of hydrochloric acid, 5 to 10 parts by weight of nitric acid, and 1 to 10 parts by weight of hydrogen peroxide, with respect to 100 parts by weight of distilled water, are preferable. Unlike aluminum alloys, in the case of zinc alloys and magnesium alloys, those containing hydrochloric acid, sulfuric acid, and hydrogen peroxide in the above relative ratio have the greatest etching efficiency.

After the etching, smut formed on a surface is primarily removed using pure water, an aqueous solution containing nitric acid, or an aqueous solution containing hydrogen peroxide. Smut is formed by various factors, but in the case of alloys for die-casting, impurities are a very high amount of about 3 to 5%, and thus are present in a large amount due to many components that are insoluble in the etching solution, and accordingly, even when desmutting is performed using an aqueous solution containing nitric acid, a certain amount of smut remains. In particular, since the desmut solution containing nitric acid has been used for aluminum alloys, a considerable amount of smut remains even after the desmutting in the case of zinc alloys and magnesium alloys or die-casting parts thereof. In particular, a small metal-polymer resin bonded body having a complex shape failed to satisfy conditions of high adhesion and airtightness. Therefore, in the case of zinc alloys and magnesium alloys or die-casting parts thereof, a method for preparing a metal-polymer resin bonded body through direct polymer injection has not been used.

In the present invention, in the case of zinc alloys, magnesium alloys, or die-casting parts thereof, unlike aluminum alloys, when an alkaline aqueous solution containing hydroxide of an alkali metal or an alkaline earth metal is used as a desmut solution, and ultrasonic cleaning and electrolyzing in specific conditions which will be described below are added, the limitations described above were confirmed to be resolved. In this case, among the hydroxides of alkali metals or alkaline earth metals, in particular, sodium hydroxide and potassium hydroxide have the greatest desmut efficiency.

Thereafter, the ultrasonic cleaning is performed, using an ultrasonic wave of 15 to 70 kHz for 1 to 5 minutes in a bath containing distilled water. As for an ultrasonic generator, a plurality of devices may be concurrently used for one cleaning tank. When the ultrasonic frequency is too small, it is dissatisfactory in that smut is not removed in a significant amount, and when the ultrasonic frequency is too high, it is dissatisfactory in that a product is detached from a jig. Therefore, the ultrasonic frequency is combined with other processes within the above range to provide an optimal effect. In addition, when the ultrasonic cleaning is performed using an aqueous solution containing 1 part by weight to 10 parts by weight of hydrogen peroxide, cleaning is performed better.

Through this process, smut is almost completely removed even for zinc or magnesium alloy materials having a high amount of impurities.

Then, electrolyzing is performed and surprisingly, when (1) an aqueous solution containing at least one of hydroxide of an alkali metal or an alkaline earth metal, (2) phosphate or sulfate, and (3) silicate, as an electrolyte used in the electrolyzing, high tensile strength is achieved. Among these, particularly the case in which all three are included is most preferable.

Sodium hydroxide, potassium hydroxide, magnesium hydroxide, or calcium hydroxide may be used as the hydroxide of an alkali metal or an alkaline earth metal, but sodium hydroxide or potassium hydroxide, which is the hydroxide of an alkali metal, is preferable due to higher electrolytic efficiency thereof. Lithium hydroxide is excellent, but is provided at a high unit price.

The hydroxide of an alkali metal or an alkaline earth metal is preferably in an amount of 0.1 to 20 parts by weight, more preferably 1 part by weight to 15 parts by weight, more preferably 2 to 10 parts by weight, most preferably 3 to 7 parts by weight, with respect to 100 parts by weight of distilled water. When the amount is less than this, it is dissatisfactory in terms of higher voltage, increased power consumption, and uneven coating on a metal surface, and when the amount is greater than this, it is dissatisfactory in terms of irregular coating.

As a phosphate compound, sodium pyrophosphate, sodium acid pyrophosphate, calcium pyrophosphate, tin pyrophosphate, copper pyrophosphate, iron pyrophosphate, sodium iron pyrophosphate, potassium pyrophosphate, isopentenyl pyrophosphate, melamine pyrophosphate, thiamine pyrophosphate, and the like are preferable. Among these, sodium pyrophosphate and potassium pyrophosphate are most preferable in terms of electrolytic efficiency.

As a sulfate compound, ammonium sulfate, ammonium persulfate, ammonium hydrogen sulfate, calcium sulfate, potassium persulfate, potassium pyrosulfate, zinc sulfate, sodium thiosulfate, sodium hydrogen sulfate, sodium sulfate, sodium pyrosulfate, kanamycin sulfate, cerium sulfate, cefquinome sulfate, sodium dodecyl sulfate, magnesium sulfate, and the like are preferable. Among these, potassium sulfate and sodium sulfate are most preferable in terms of electrolytic efficiency.

The sulfate compound or the phosphate compound is preferably in an amount of 0.1 to 25 parts by weight, more preferably 3 to 17 parts by weight, more preferably 5 to 15 parts by weight, most preferably 7 to 12 parts by weight, with respect to 100 parts by weight of distilled water. When the amount is less than this, it is dissatisfactory in terms of uneven coating on a metal surface, and when the amount is greater than this, it is dissatisfactory in terms of irregular coating.

As the silicate compound, calcium silicate, magnesium silicate, magnesium fluorosilicate, zinc fluorosilicate, aluminum silicate, zirconium silicate, sodium orthosilicate, sodium silicate, sodium metasilicate, sodium fluorosilicate, lithium metasilicate, ethyl silicate, potassium silicate, and the like are preferable. Among these, sodium silicate and sodium metasilicate are particularly preferable in terms of electrolytic efficiency.

The silicate compound is preferably in an amount of 0.1 to 30 parts by weight, more preferably 1 to 25 parts by weight, more preferably 3 to 15 parts by weight, most preferably 4 to 10 parts by weight, with respect to 100 parts by weight of distilled water. When the amount is less than this, it is dissatisfactory in terms of uneven coating on a metal surface, and when the amount is greater than this, it is dissatisfactory in terms of irregular coating.

When a process using an electrolyte containing all these three compounds is combined with the desmutting and the ultrasonic cleaning, a bonding strength at an interface between polymer and metal is surprisingly improved, and it seems to be because the electrolytic efficiency is dramatically improved through interactions, in particular, when all these three compounds are used.

When all these three compounds are used, a relative amount also has a significant effect on the bonding strength, and when the relative amounts of these are 40 to 350 parts by weight of phosphate or sulfate and 30 to 150 parts by weight of silicate, with respect to 100 parts by weight of hydroxide of an alkali metal or an alkaline earth metal, the electrolysis efficiency is particularly excellent. 150 to 250 parts by weight of phosphate or sulfate and 70 to 130 parts by weight of silicate, with respect to 100 parts by weight of hydroxide of an alkali metal or an alkaline earth metal are most preferable.

The electrolyzing is preferably performed at a voltage of 0.1 to 10 V and a current density of 0.1 to 5 A/dm2, at a temperature of 10 to 70° C., for 180 to 2400 seconds. More preferably, the electrolyzing is performed at a voltage of 1 to 5 V, at 1 to 2 A/dm2, at 20 to 40° C., for 600 to 1800 seconds.

After going through this process, pores having an average size of several tens of nm are evenly distributed on a surface of a metal, and smuts that block these pores or grow in the form of dendrites on the surface to reduce the bonding strength upon combining with a resin are almost or completely removed.

Then, the polymer resin is injection molded to a metal part, using an injection molding machine to bond the polymer resin to the metal part, and in this case, a usable polymer resin may be any one among liquid crystal polymer (LCP), polycarbonate (PC), polybutylene terephthalate (PBT), polyphenylene sulfide (PPS), polyphthalamide (PPA), polyamide (PA), polyamide 6 (PA6), polyamide 66 (PA66), polyethylene (PE), polypropylene (PP), and thermoplastic polyurethane (TPU).

LCP is a crystalline polymer, and thus tends to have a bonding surface broken when bonded to a metal, and PE or PP is relatively softer than other polymers such as PPS, and is easily deformed by tensile force or stress, and thus tends to be relatively easily released from permeated nano-sized pores, resulting in relatively weak bonding strength. Therefore, in the case of such a polymer resin, even when prepared according to the present invention, the bonding strength is only 20 MPa or greater. A polymer resin having a melting point of less than about 200° C., such as PE and PP, or a crystalline polymer resin such as LCP usually behaves as described above.

On the other hand, polymers such as PC, PBT, PPS, PPA, PA, PA 6, and PA 66 are relatively hard, so when the polymer resins penetrate into the nanopores through injection molding and are cured, the polymer resins are not easily released even with a strong tensile force. Therefore, in the case of such a polymer resin, when prepared according to the present invention, the bonding strength is very high, such as 30 MPa or greater. A polymer resin having a melting point of 200° C. or higher, such as PET and PPS, usually behaves as above.

Meanwhile, polymers such as TPU are very soft materials and have a very high elongation rate, and thus it is technically difficult to measure tensile strength (bonding strength) itself.

EXAMPLE

Example 1

A 3 mm-thick zinc die-casting metal material was processed into a size of 40×12×3 mm to prepare 20 specimens. When performing a bonding process, additionally the prepared specimens above were processed to have a 4 mm hole so as to be mounted on a rack. Using the machined hole, the specimens were mounted on the rack.

The rack on which the prepared specimens above were mounted was placed in a distilled water mixture of sodium bicarbonate and sodium hexametaphosphate, and was subjected to ultrasonic degreasing for 60 seconds to remove impurities on a surface, and then subjected to washing again with distilled water.

The specimens washed above were put into a distilled water mixture (70° C.) of sulfuric acid (13.3 parts by weight), hydrochloric acid (13.3 parts by weight), and hydrogen peroxide (6.7 parts by weight) contained in a bubble stirrer for 5 minutes to etch, and then washed with distilled water to remove impurities and smut from a desmut solution (5% sodium hydroxide aqueous solution).

In addition, in order to completely remove impurities, ultrasonic cleaning was performed for 120 seconds at 50 kHz in an ultrasonic bath containing distilled water.

The specimens washed with ultrasonic water were put into a distilled water mixture (50° C.) of sodium hydroxide (13.3 parts by weight), sodium sulfate (13.3 parts by weight), and zinc fluorosilicate (6.7 parts by weight), and were subjected to electrolyzing for 1500 seconds at a constant voltage of 5 V to form a coating layer.

Then, the 20 specimens were injected with PPS (LG Chem). As for an injection machine, a 15-ton injection machine from Daekyung Hydraulics was used, and the injection was performed by setting a mold temperature to 150° C., a nozzle temperature to 330° C., an injection pressure to 70 bar, and a holding pressure to 5 seconds. Out of the total 20 specimens, 10 were used for a tensile test and the remaining 10 were used for a leakage test.

Example 2

Example 2 was performed in the same manner as Example 1, except that an aqueous solution containing 5 wt % of hydrogen peroxide was used instead of distilled water for ultrasonic cleaning.

Example 3

Example 3 was performed in the same manner as Example 1, except that an aqueous solution containing only 20 parts by weight of sodium hydroxide was used as an electrolyte.

Example 4

Example 4 was performed in the same manner as Example 1, except that an aqueous solution containing only 20 parts by weight of sodium sulfate was used as an electrolyte.

Example 5

Example 5 was performed in the same manner as Example 1, except that an aqueous solution containing only 20 parts by weight of zinc fluorosilicate was used as an electrolyte.

Example 6

Example 6 was performed in the same manner as Example 1, except that a distilled water mixture of sodium hydroxide (6.7 parts by weight) and zinc fluorosilicate (6.7 parts by weight) was used as an electrolyte.

Example 7

Example 7 was performed in the same manner as Example 1, except that a distilled water mixture of sodium hydroxide (6.7 parts by weight) and sodium sulfate (6.7 parts by weight) was used as an electrolyte.

Example 8

Example 8 was performed in the same manner as Example 1, except that a distilled water mixture of sodium sulfate (6.7 parts by weight) and zinc fluorosilicate (6.7 parts by weight) was used as an electrolyte.

Example 9

Example 9 was performed in the same manner as Example 1, except that a metal material was changed to a magnesium alloy.

Example 10

Example 10 was performed in the same manner as Example 1, except that a polymer resin was changed to PE from LG Chem.

Comparative Example 1

Comparative Example 1 was performed in the same manner as Example 1, except that an aqueous solution containing 10 parts by weight of oxalic acid and 5 parts by weight of citric acid was used as an electrolyte.

Comparative Example 2

Comparative Example 2 was performed in the same manner as Example 1, except that a desmutting process was omitted.

Comparative Example 3

Comparative Example 3 was performed in the same manner as Example 1, except that an ultrasonic cleaning process was omitted.

Comparative Example 4

Comparative Example 4 was performed in the same manner as Example 1, except that a metal material was changed to an aluminum alloy (AL6063).

Comparative Example 5

Comparative Example 5 was performed in the same manner as Example 1, except that an ultrasonic wave applied in an ultrasonic cleaning process was changed to 5 kHz.

Comparative Example 6

Comparative Example 6 was performed in the same manner as Example 1, except that an ultrasonic wave applied in an ultrasonic cleaning process was changed to 90 kHz.

Comparative Example 7

Comparative Example 7 was performed in the same manner as Example 1, except that a desmut solution was changed to a 5% nitric acid aqueous solution.

Comparative Example 8

Comparative Example 8 was performed in the same manner as Example 10, except that a desmut solution was changed to a 5% nitric acid aqueous solution.

※ Method for Measuring Properties

Tensile Strength (Adhesive Strength)

An adhesive strength between a metal alloy and a cured resin was measured using a tensile tester (UTM, Time Group) at a point at which the alloy and the polymer resin were separated upon peeling at a rate of 5 mm/min. The same experiment was repeated 10 times to determine an average value for the tensile strength.

Airtightness Test

In order to determine the uniformity of adhesion between the alloy and the cured polymer resin, an amount of helium leakage at an interface was measured using Canon ANELVA's helium leakage tester. With respect to $10^{-8}$ Pa·m$^3$/s, the helium leakage was marked as satisfactory when the amount was less than $10^{-8}$ Pa·m$^3$/s, and was marked as defective when the amount was greater than $10^{-8}$ Pa·m$^3$/s. Likewise, the same airtightness test was repeated on 10 samples to determine the number of defects. With respect to 10 times of measurement, an average value of the helium leakage amount was obtained as an arithmetic average when measured accurately, and otherwise, when the satisfactory mark was less than 5 times, the average value was determined to be less than the above standard.

The test results are shown in Table 1 below.

TABLE 1

| Item | Tensile strength (MPa) | No. of helium leakage defects | Remarks |
|---|---|---|---|
| Example 1 | 38.2 | 0 | Reference Example |
| Example 2 | 39.1 | 0 | Change of ultrasonic cleaning solution |
| Example 3 | 32.4 | 1 | Change of electrolyte |
| Example 4 | 31.1 | 2 | Change of electrolyte |
| Example 5 | 34.2 | 1 | Change of electrolyte |
| Example 6 | 33.9 | 1 | Change of electrolyte |
| Example 7 | 34.1 | 1 | Change of electrolyte |
| Example 8 | 33.1 | 1 | Change of desmut solution |
| Example 9 | 38.0 | 0 | Change of metal material |
| Example 10 | 23.7 | 0 | Change of polymer resin |
| Comparative Example 1 | 22.1 | 10 | Change of electrolyte |
| Comparative Example 2 | 29.8 | 6 | Omission of desmutting |
| Comparative Example 3 | 28.3 | 7 | Omission of ultrasonic cleaning |
| Comparative Example 4 | 24.8 | 10 | Change of metal material |
| Comparative Example 5 | 27.7 | 7 | Change of ultrasonic frequency |
| Comparative Example 6 | 37.6 (not measurable due to desorption of 2 samples) | 0 (not measurable due to desorption of 2 samples) | Change of ultrasonic frequency |
| Comparative Example 7 | 22.7 | 8 | Change of desmut solution |
| Comparative Example 8 | 9.8 | 8 | Change of desmut solution |

As determined in the table above, PPS, which is relatively hard after curing, has been shown to have excellent bonding strength and airtightness when both desmutting and cleaning are performed before a process using an electrolyte containing a specific component is performed, and when any one of hydrate of an alkali metal or an alkaline earth metal, phosphate or sulfate, and silicate of is not included or even one of the desmutting or the cleaning is omitted, PPS had a tensile strength of 25 MPa or less, and an average helium leakage amount of greater than a reference value and thus had weak airtightness, making it unusable as a waterproof part. In particular, despite the application of the same preparation process, when using an aluminum alloy material, adhesive strength was not sufficient, and thus seems to be due to the fact that the material properties of aluminum alloys are different from those of zinc alloys or magnesium alloys.

In addition, the case of using an electrolyte containing hydrate of an alkali metal or an alkaline earth metal, sulfate, and silicate all was particularly superior, and in the ultrasonic cleaning, an aqueous solution containing hydrogen peroxide was slightly better than the distilled water.

Accordingly, a metal-polymer resin bonded body prepared according to the present invention, using a hard polymer resin such as PPS as a raw material, has a tensile strength of 30 MPa and obtains airtightness, and in addition, according to the preparation method of the present invention, without using a separate adhesive tape or glue, preparing a metal-polymer resin bonded body is achievable through insert injection for zinc alloys, magnesium alloys, or die-casting parts thereof.

Meanwhile, in the case of using a soft polymer resin such as PE as a raw material, it is determined that 20 MPa or greater, which is the strength of bonding using glue, is achieved.

According to the present invention, a metal-polymer resin composite prepared through direct injection to a zinc alloy, a magnesium alloy, or a die-casting part thereof and bonding thereto, unlike typical types using glue or tape adhesive, may be easily bonded to various shapes as well as an inner surface having a three-dimensional shape by injection in addition to excellent adhesion and airtightness, and may also be thin and become smaller to be used in camera holders, brackets, automobile parts, and the like. In particular, the metal-polymer resin composite may be used very usefully as a small camera holder used in small electronic devices such as mobile phones.

DESCRIPTION OF SYMBOLS

100 metal-polymer resin composite
110 metal die-casting without etching and electrolyzing
111 metal die-casting with etching and electrolyzing
120 double sided tape or glue
130 plastic injection product

The invention claimed is:

1. A method for preparing a metal-polymer resin composite by bonding a metal member, which is a zinc alloy, a magnesium alloy, or a die-casting part thereof, to a polymer resin through a degreasing process, an etching process, an electrolysis process, and an injection process, wherein the metal member is subjected to etching, desmutting, and ultrasonic cleaning, the electrolysis process is performed in an electrolyte containing at least one of (1) a hydroxide of an alkali metal or an alkaline earth metal, (2) a phosphate compound or a sulfate compound, and (3) a silicate compound, the hydroxide of an alkali metal or an alkaline earth metal is at least any one of sodium hydroxide, potassium hydroxide, magnesium hydroxide, or calcium hydroxide, the phosphate compound is at least any one of sodium pyrophosphate, sodium acid pyrophosphate, calcium pyrophosphate, tin pyrophosphate, copper pyrophosphate, iron pyrophosphate, sodium iron pyrophosphate, potassium pyrophosphate, isopentenyl pyrophosphate, melamine pyrophosphate, or thiamine pyrophosphate, the sulfate compound is at least any one of ammonium sulfate, ammonium persulfate, ammonium hydrogen sulfate, calcium sulfate, potassium persulfate, potassium pyrosulfate, zinc sulfate, sodium thiosulfate, sodium hydrogen sulfate, sodium sulfate, sodium pyrosulfate, kanamycin sulfate, cerium sulfate, cefquinome sulfate, sodium dodecyl sulfate, or magnesium sulfate, the hydroxide of an alkali metal or an alkaline earth metal is in an amount of 0.1 to 20 parts by weight with respect to 100 parts by weight of distilled water, the sulfate compound is in an amount of 0.1 to 20 parts by weight with respect to 100 parts by weight of distilled water, the silicate compound is in an amount of 0.1 to 30 parts by weight with respect to 100 parts by weight of distilled water, and when two or more materials are used together in the electrolysis process, the materials are in a relative amount of 40 to 350 parts by weight of phosphate and 30 to 150 parts by weight of silicate with respect to 100 parts by weight of the hydroxide of an alkali metal or an alkaline earth metal.

2. The method of claim 1, wherein the ultrasonic cleaning is performed in an aqueous solution containing hydrogen peroxide.

3. The method of claim 1, wherein ultrasound used in the ultrasonic cleaning is 15 to 70 kHz.

4. The method of claim 1, wherein the desmutting is performed in an alkaline aqueous solution.